(12) United States Patent
Kwon et al.

(10) Patent No.: US 8,594,675 B2
(45) Date of Patent: Nov. 26, 2013

(54) MULTI-CELL COMMUNICATION METHOD AND SYSTEM OF A MOBILE TERMINAL, A MICRO BASE STATION, AND A MACRO BASE STATION

(75) Inventors: Tae Soo Kwon, Hwaseong-si (KR); Kyung Hun Jang, Suwon-si (KR); Jong Bu Lim, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 12/987,378

(22) Filed: Jan. 10, 2011

(65) Prior Publication Data
US 2011/0275378 A1 Nov. 10, 2011

(30) Foreign Application Priority Data

May 10, 2010 (KR) .................. 10-2010-0043414

(51) Int. Cl.
*H04W 36/00* (2009.01)
(52) U.S. Cl.
USPC ........... 455/437; 455/436; 455/509; 455/450; 370/331; 370/328; 370/329; 370/341; 370/338
(58) Field of Classification Search
USPC .......... 455/436, 509, 450; 370/331, 328, 329, 370/310.2, 341, 338
See application file for complete search history.

(56) References Cited

U.S. PATENT DOCUMENTS

| | | | |
|---|---|---|---|
| 7,447,523 B2 | 11/2008 | Goldberg et al. | |
| 2007/0218880 A1* | 9/2007 | Felter et al. | 455/414.1 |
| 2008/0076423 A1* | 3/2008 | Lee et al. | 455/436 |
| 2008/0261602 A1 | 10/2008 | Livneh | |
| 2009/0093252 A1* | 4/2009 | Czaja et al. | 455/436 |
| 2009/0098873 A1 | 4/2009 | Gogic | |
| 2009/0219900 A1* | 9/2009 | Kokkinen et al. | 370/338 |
| 2009/0257393 A1* | 10/2009 | Li et al. | 370/329 |
| 2009/0310561 A1 | 12/2009 | Grob et al. | |
| 2009/0312019 A1* | 12/2009 | Chen et al. | 455/435.2 |
| 2010/0113036 A1 | 5/2010 | Cho et al. | |
| 2011/0319013 A1* | 12/2011 | Jung et al. | 455/7 |

FOREIGN PATENT DOCUMENTS

| | | |
|---|---|---|
| KR | 10-2009-0032544 | 4/2009 |
| KR | 10-2009-0072765 A | 7/2009 |
| KR | 10-2009-0100000 | 9/2009 |
| KR | 10-2009-0112337 | 10/2009 |
| KR | 10-2009-0112911 | 10/2009 |

OTHER PUBLICATIONS

International Search Report and Written Opinion of the International Searching Authority issued Sep. 26, 2011, in counterpart International Application No. PCT/KR2011/000471 (7 pp, in English).

* cited by examiner

*Primary Examiner* — Kwasi Karikari
(74) *Attorney, Agent, or Firm* — NSIP Law

(57) ABSTRACT

Communication methods of a macro base station which collects position information about a mobile micro base station and that is served by the macro base station, predicts a channel between the macro base station and the micro base station, and performs a handover between the macro base station and the micro base station based on a state of the predicted channel is provided.

19 Claims, 14 Drawing Sheets

1300

1400

MULTI-CELL COMMUNICATION METHOD AND SYSTEM OF A MOBILE TERMINAL, A MICRO BASE STATION, AND A MACRO BASE STATION

CROSS-REFERENCE TO RELATED APPLICATION(S)

This application claims the benefit under 35 U.S.C. §119(a) of Korean Patent Application No. 10-2010-0043414, filed on May 10, 2010, in the Korean Intellectual Property Office, the entire disclosure of which is incorporated herein by reference for all purposes.

BACKGROUND

1. Field

The following description relates to a multi-cell communication system including a macrocell and a microcell.

2. Description of Related Art

A multi-cell communication system, for example, a hierarchical-cell communication system, typically includes a macrocell and at least one microcell. For example, the macrocell may include a macro base station of a cellular communication system, and the microcell may include a femto base station or pico base station.

A micro base station, such as a femto base station or pico base station, may be fixed in a predetermined position in order to serve terminals, or it may be installed in vehicles having mobility, for example, a bus, in order to serve terminals on the bus.

SUMMARY

In one general aspect, there is provided a communication method of a macro base station, the communication method comprising collecting position information about a micro base station that is mobile and that is served by the macro base station, predicting a channel between the macro base station and the micro base station using information stored in a channel prediction database that stores information about channels between the macro base station and the micro base station and the position information about the micro base station based on possible positions of the micro base station, and transmitting and receiving data between the macro base station and the micro base station based on a state of the predicted channel.

The predicting of the channel may comprise predicting a traveling path of the micro base station using information stored in the channel prediction database, and extracting the information about the channels between the macro base station and the micro base station based on the possible positions of the micro base station from the channel prediction database.

The channel prediction database may further store at least one of information about a traveling path of the micro base station, information about geographical features of the surroundings of the micro base station based on the possible positions of the micro base station, information about possible traveling directions of the micro base station, and information about possible traveling speeds of the micro base station.

The communication method may further comprise collecting information about the mobility of the micro base station, wherein the predicting of the channel further comprises predicting the channel based on the information about mobility of the micro base station.

The micro base station may comprise a femto base station or a moving relay and the micro base station may be installed in a mobile vehicle.

In the transmitting and the receiving of the data, a beam may be formed between the macro base station and the micro base station based on a strength of the channel or a direction of the channel.

The transmitting and the receiving of the data may comprise determining a level of an optimal modulation and coding scheme (MSC) or determining an allocation structure of an optimal wireless resource, based on a strength of the channel or a direction of the channel.

The communication method may further comprise determining whether a traveling path of the micro base station is predictable, and requesting feedback on information about the channel from the micro base station based on whether the traveling path of the micro base station is predictable.

The predicting of the channel may comprise predicting the channel without requesting feedback on information about the channel from the micro base station during a preset time period.

The transmitting and the receiving of the data may comprise performing collective link adaptation for a plurality of terminals in a zone that the micro base station exists in.

In another aspect, there is provided a communication method of a micro base station that is mobile, the communication method comprising collecting position information of the micro base station and reporting about the information to a macro base station, predicting a channel between the macro base station and the micro base station using information stored in a channel prediction database that stores information about channels between the macro base station and the micro base station and the position information about the micro base station based on possible positions of the micro base station, and transmitting and receiving data between the macro base station and the micro base station based on a state of the predicted channel.

The predicting of the channel may comprise predicting a traveling path of the micro base station using the information stored in the channel prediction database, and extracting the information about the channels between the macro base station and the micro base station based on the possible positions of the micro base station using the channel prediction database.

The communication method may further comprise reporting about the position information about the micro base station to a neighbor macro base station when additional association is needed between the neighbor macro base station and the micro base station.

The communication method may further comprise selecting one macro base station from among the macro base station and the neighbor macro base station, and transmitting data to the selected one macro base station so that the macro base station and the neighbor macro base station share the data.

The channel prediction database may further store at least one of information about a traveling path of the micro base station, information about geographical features of surroundings of the micro base station based on the possible positions of the micro base station, information about possible traveling directions of the micro base station, and information about possible traveling speeds of the micro base station.

In another aspect, there is provided a communication method of a macro base station, the communication method comprising continuously maintaining a control channel between a terminal and the macro base station, receiving a handover request message of the terminal through the control channel between the terminal and the macro base station, and establishing a data channel between the terminal and the macro base station in response to the handover request message or transmitting data to a micro base station in a cell coverage of the macro base station.

The continuously maintaining the control channel may comprise continuously maintaining the control channel regardless of whether a target base station of a handover is the micro base station or the macro base station.

The communication method may further comprise determining whether the terminal performs a handover with the micro base station or the macro base station based on the handover request message.

The transmitting of the data to the micro base station may comprise disconnecting the data channel between the macro base station and the terminal when a handover is performed to the micro base station of the macro base station and the micro base station.

The continuously maintaining the control channel between the terminal and the macro base station may comprise continuously maintaining the control channel between the terminal and the macro base station regardless of the terminal requesting a handover to be performed from the micro base station to another micro base station.

The continuously maintaining the control channel station may comprise continuously maintaining the control channel between the terminal and the macro base station until a control channel between the terminal and another macro base station is established.

In another aspect, there is provided a communication method of a terminal, the communication method comprising continuously maintaining a control channel between the terminal and a macro base station regardless of whether a target base station of a handover is a micro base station or the macro base station, transmitting a handover request message of the terminal to the macro base station through the control channel between the terminal and the macro base station, and establishing a data channel between the terminal and the macro base station or receiving data from the micro base station.

The continuously maintaining the control channel may comprise continuously maintaining the control channel between the terminal and the macro base station until a control channel between the terminal and another macro base station is established.

The receiving of the data from the micro base station may comprise establishing a data channel between the micro base station and the terminal while the control channel between the terminal and the macro base station is continuously maintained and when the micro base station is the target base station.

In another aspect, there is provided a computer-readable storage medium having stored therein program instructions to cause a processor to implement a communication method of a macro base station, the communication method comprising collecting position information about a micro base station that is mobile and that is served by the macro base station, predicting a channel between the macro base station and the micro base station using information stored in a channel prediction database that stores information about channels between the macro base station and the micro base station and the position information about the micro base station based on possible positions of the micro base station, and transmitting and receiving data between the macro base station and the micro base station based on a state of the predicted channel.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

As described herein, the term mobility may refer to, for example, an object that is in motion or an object that is stationary and that is capable of being in motion. It should also be appreciated, an object that is in motion may be stopped at any given time, and an object not in motion may be set in motion at any given time. Examples of vehicles in motion include trains, buses, boats, airplanes, metro-trains, cars, cruise ships, and the like.

Figure 1:
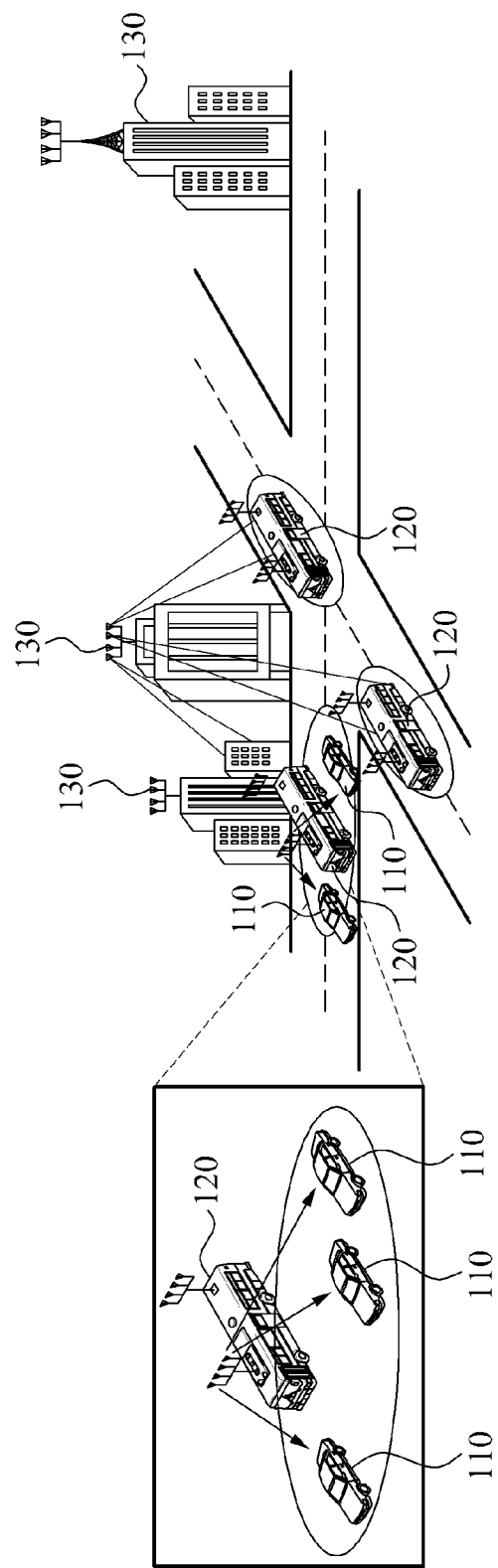
FIG. 1 illustrates an example of a communication system using a micro base station.

FIG. 1 illustrates an example of a communication system using a micro base station.

Referring to FIG. 1, the communication system includes a terminal 110, a micro base station 120, and a macro base station 130.

For example, the terminal 110 may be a device carried by a user in a mobile vehicle such as a car or may be a device moving or standing still within a cell coverage of the micro base station 120.

In this example, the micro base station 120 is served by the macro base station 130, and may be installed in a mobile vehicle such as a car. For example, the micro base station 120 may include a femto base station, a pico base station, a moving relay, and the like. If the micro base station 120 is installed in a mobile vehicle, the micro base station 120 may transmit and receive data to and from the terminal 110 around the mobile vehicle or in the mobile vehicle.

Generally, the micro base station 120 and the terminal 110 are positioned relatively close to each other. Although the micro base station 120 typically has a smaller cell coverage than a macro base station 130, the micro base station 120 may transmit data to the terminal 110 or receive data from the terminal 110 at a relatively higher speed as compared with the macro base station 130. If the micro base station 120 is installed in the mobile vehicle such as a car, the terminal 110 may need to perform a handover frequently, for example, because of the movement of the vehicle and the coverage area of the micro base station 120.

The macro base station 130 and the terminal 110 are generally positioned relatively distant from each other. The macro base station 130 may transmit data to the terminal 110 or receive data from the terminal 110 at a relatively low speed as compared with the micro base station 120.

However, because the macro base station 130 has a relatively larger cell coverage as compared with the micro base station 120, a channel between the macro base station 130 and the terminal 110 may be maintained stably without the need for frequent handovers.

In this example, the terminal 110 may use the advantages of both the characteristics of channels of the micro base station 120 and characteristics of channels of the macro base station 130. Accordingly, the terminal 110 may transmit and receive a high capacity of data and perform a handover quickly.

Because the micro base station 120 has mobility, a change in a channel between the micro base station 120 and the macro base station 130 may be relatively substantial. For example, when the micro base station 120 is installed in a car and the like, a channel between the micro base station 120 and the macro base station 130 may be changed substantially according to time, and thus it may be difficult to identify the channel between the micro base station 120 and the macro base station 130.

When the channel between the micro base station 120 and the macro base station 130 is changed according to time, a large amount of overhead may be used by the micro base station 120 in order to estimate the channel and to provide feedback on information about the channel ("channel information") in real-time or frequently to the macro base station 130.

In this example, the micro base station 120 and the macro base station 130 may use a channel prediction database for storing, in advance, information about respective channels between the micro base station 120 and the macro base station 130 based on possible positions of the micro base station 120 in order to efficiently share the information about the channel. For example, the channel prediction database may store information about respective channels between the micro base station 120 and the macro base station 130. The information about respective channels may include information about a channel between the macro base station 130 and the micro base station 120 when the micro base station 120 is at different locations within the cell coverage area of the macro base station 130.

For example, even though the micro base station 120 does not feed back the information about the channel in real time or frequently, the macro base station 130 may identify a channel between the micro base station 120 and the macro base station 130 through the channel predication database. For example, if the macro base station 130 is aware of micro base station information such as a current position, a previous position, a traveling path, a traveling speed, geographical features of surroundings, and the like, of the micro base station 120, the macro base station 130 may identify a channel between the micro base station 120 and the macro base station 130.

Figure 2:
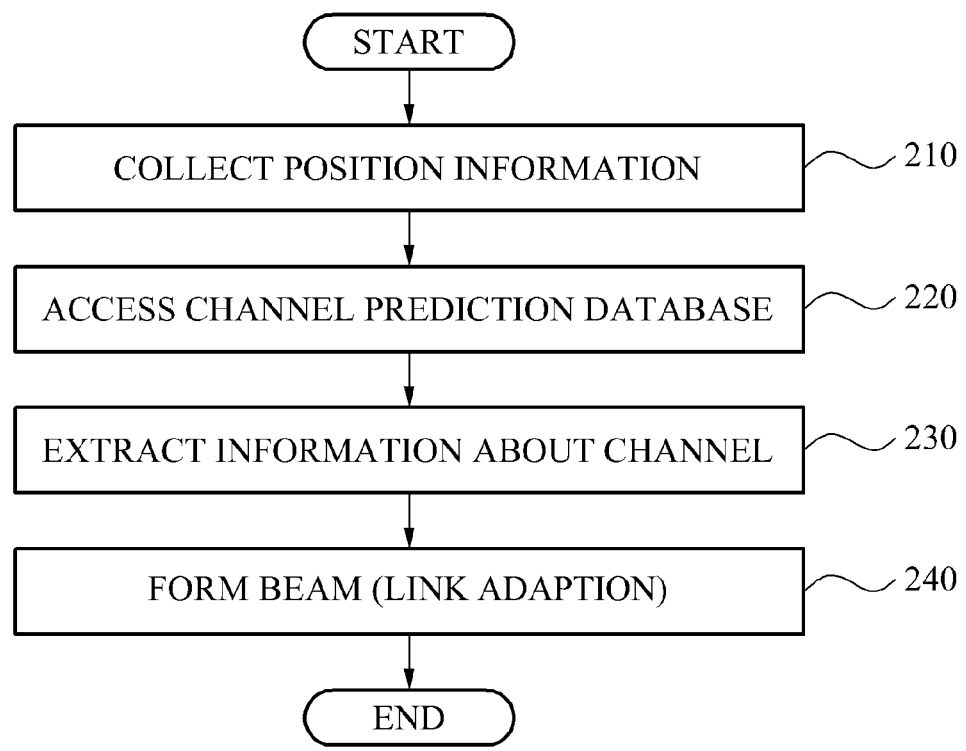
FIG. 2 is a flowchart illustrating an example of a communication method of a macro base station.

FIG. 2 illustrates an example of a communication method of a macro base station.

Referring to FIG. 2, in 210 a macro base station collects position information about a micro base station that has mobility and that is served by the macro base station. For example, the micro base station may collect position information about the micro base station using a global positioning system (GPS), an accelerator sensor, a gyro sensor, and the like, and may report information about the position of the micro base station to the macro base station.

For example, the position information about the micro base station may include information about a current position of the micro base station and may further include information about mobility of the micro base station. For example, the information about mobility may include information about a traveling path, information about a traveling speed, information about a traveling direction, and the like.

The macro base station accesses the channel prediction database in order to predict a channel between the micro base station and the macro base station based on a current position of the micro base station, in 220. For example, the channel prediction database may store, in advance, channel information about respective channels between the macro base station and the micro base station based on possible positions of the micro base station.

For example, when the possible positions of the micro base station include (X1, Y1), (X2, Y2), and (X3, Y3), the channel predication database may store, in advance, information about a signal-to-noise ratio, a signal-to-noise plus interference ratio, a packet error rate, a bit error rate, a strength, and a direction of channels between the macro base station and the locations of (X1, Y1), (X2, Y2 ), and (X3, Y3), respectively.

In this example, when the micro base station travels along a predetermined path, the potential positions of the micro base station may decrease. For example, the channel prediction database may further store information about a traveling path of the micro base station, information about geographical features of surroundings of the micro base station in the possible positions of the micro base station, information about possible traveling directions of the micro base station, information about possible traveling speeds of the micro base station, and the like.

Accordingly, the channel information stored in advance in the channel predication database may be calculated, for example, based on the information about the traveling path of the micro base station, the information about the geographical features of surroundings of the micro base station based on the possible positions of the micro base station, the information about the possible traveling directions of the micro base station, the information about the possible traveling speeds of the micro base station, and the like.

For example, the channel prediction database may store channel information with respect to a speed of the micro base station v1, v2, and v3 and a traveling direction of the micro base station x, y, and z in a possible position of the micro base station (X1, Y1). For example, when a current position of the micro base station is (X1, Y1), a current speed of the micro base station is v1, and a current traveling direction of the micro base station is z, the macro base station may predict a current channel with reference to the information about the channels stored in advance in the channel predication database. Accordingly, the macro base station may predict the current channel being used by the micro base station without receiving feedback on the channel information.

In 230, the macro base station extracts information about the current channel between the micro base station and the macro base station using the position information of the micro base station and the channel prediction database.

For example, as described above, when the information about mobility of the micro base station is identified, the macro base station may extract the information about the current channel accurately. For example, the information about mobility of the micro base station may include a traveling speed, a traveling direction, and a traveling path of the micro base station.

When the macro base station predicts a traveling path of the micro base station, for example, when the traveling path of the micro base station is predetermined and when the traveling direction of the micro base station is predetermined or has a predetermined pattern, the macro base station may predict the information about the current channel more efficiently. Accordingly, even though the position information about the micro base station is not frequently collected, the macro base station may predict a current position of the micro base station reasonably and accurately. As a result, less overhead may be used to predict the information about the current channel and more channel space and channel resources may be conserved.

In some embodiments, if the macro base station does not predict the traveling path of the micro base station precisely, such as when the traveling path of the micro base station is not predetermined, or in an example in which the macro base station desires even more information about the micro base station, the macro base station may collect the position information about the micro base station frequently. In this example, overhead may increase due to the collection of the position information.

As another example, when the traveling path of the micro base station is not precisely predicted, or in an example in which the macro base station desires even more information about the micro base station, the macro base station may request feedback on the information about the channel from the micro base station instead of collecting the position information about the micro base station. For example, the macro base station may determine whether the traveling path of the micro base station is predictable, and may request feedback on the information about the channel, may request the position information, or may immediately predict the channel based on a determination result.

For example, the macro base station may use an identification (ID) of the micro base station to determine whether the traveling path of the micro base station is predictable. As another example, the macro base station may determine whether the traveling path of the micro base station is predictable based on various factors, such as whether a traveling pattern of the micro base station matches a predefined pattern or a structure of a road on which the micro base station stands.

The macro base station performs link adaptation, such as formation of a beam, based on a strength or a direction of the predicted channel, in 240. Then, the macro base station may transmit and receive data between the macro base station and the micro base station based on a state of the predicted channel, for example, using a beam formed between the macro base station and the micro base station.

For example, the macro base station may determine a level of an optimal modulation and coding scheme (MSC) or may determine an allocation structure of an optimal wireless resource based on the strength or the direction of the channel.

The macro base station may perform collective link adaption for a plurality of terminals in a zone in which the micro base station exists. In this example, one zone may include at least one micro base station, and the macro base station may divide an entire space into a plurality of zones and may perform link adaptation in each zone. For example, the same beam may be formed for a plurality of micro base stations that exist in the same zone.

Figure 3:
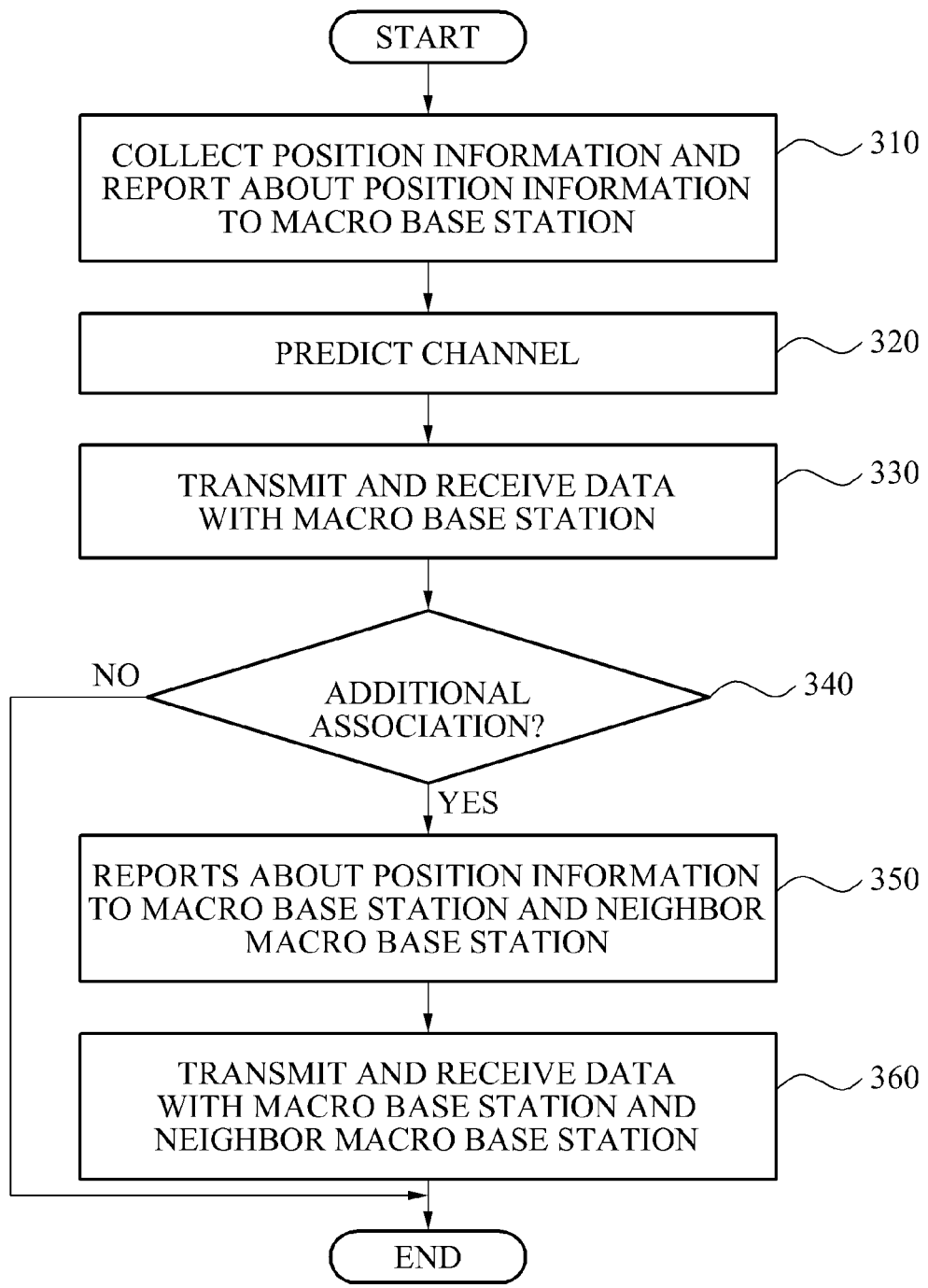
FIG. 3 is a flowchart illustrating an example of a communication method of a micro base station.

FIG. 3 illustrates an example of a communication method of a micro base station.

Referring to FIG. 3, a micro base station collects position information about the micro base station and reports about the position information about the micro base station to a macro base station, in 310. In this example, the micro base station may have mobility or may be in motion.

For example, the micro base station may predict a channel between the macro base station and the micro base station using information stored in a channel prediction database that stores information about channels between the macro base station and the micro base station and the position information about the micro base station based on possible positions of the micro base station, in 320.

The micro base station transmits and receives data between the macro base station and the micro base station based on a state of the predicted channel, in 330. For example, the micro base station and the macro base station may share the channel information about the channels between the macro base station and the micro base station, and the micro base station may properly respond to link adaption performed by the macro base station. For example, the macro base station may transmit and receive a beam with the micro base station based on a zone.

The micro base station determines whether there is a need for additional association between a neighbor macro base station and the micro base station, in 340. As an example, when the macro base station does not fill capacity required by the micro base station for itself, or when the micro base station requires more capacity, the additional association may be needed. For example, the micro base station may determine whether the additional association is needed based on a desired capacity, a state of a channel between the micro base station and the macro base station, a state of a channel between the micro base station and the neighbor macro base station, and the like.

When the additional association is not needed, the micro base station may continue communication with the macro base station instead of selecting the neighbor macro base station.

However, when there is a need for additional association between the neighbor macro base station and the micro base station, the micro base station reports about the position information about the micro base station to both the macro base station and the neighbor macro base station, in 350.

For example, the macro base station may identify the information about the channels between the macro base station and the micro base station, and the neighbor macro base station may also identify information about channels between the neighbor macro base station and the micro base station.

Accordingly, both the macro base station and the neighbor macro base station may perform link adaptation, for example, beam formation based on a zone.

The micro base station transmits and receives data with the macro base station and the neighbor macro base station through two or more beams formed by the macro base station and the neighbor macro base station, in 360.

Figure 4:
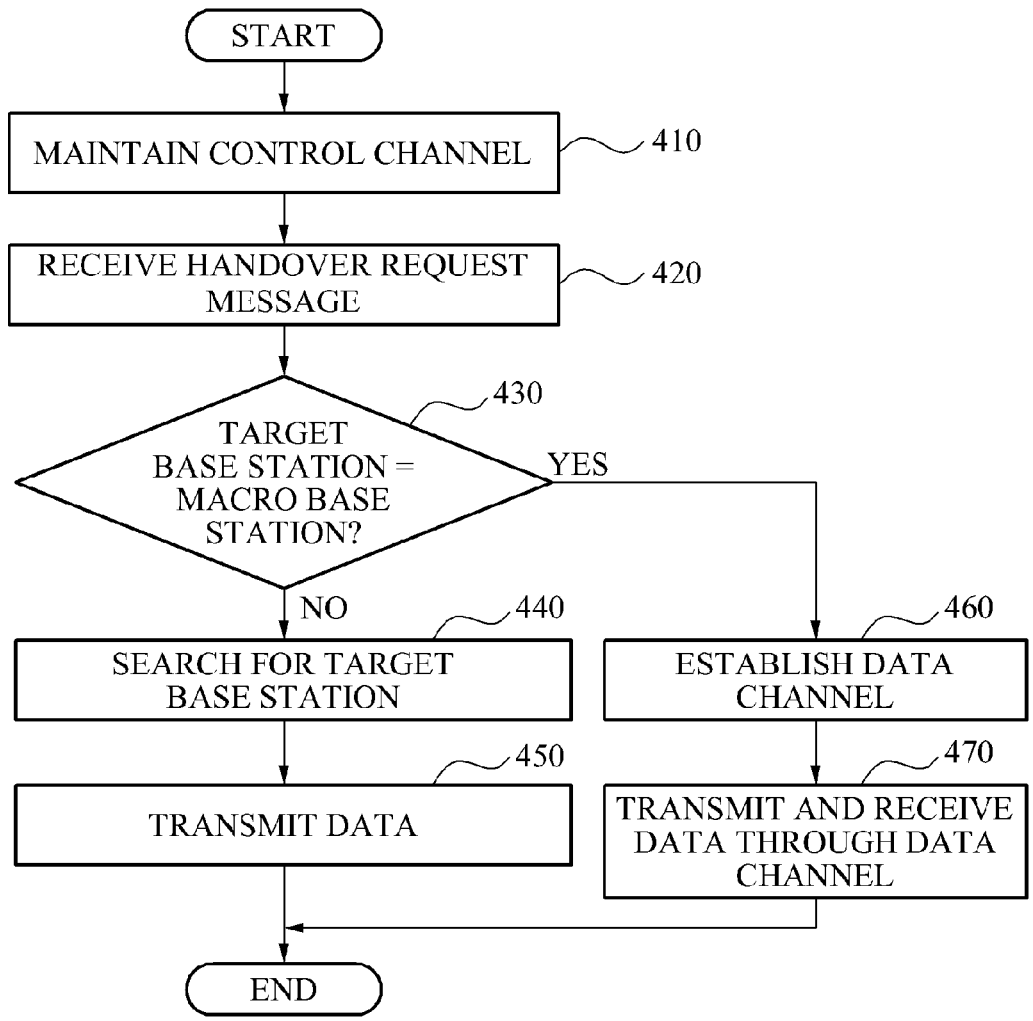
FIG. 4 is a flowchart illustrating another example of communication method of a macro base station.

FIG. 4 illustrates an example of a communication method of a macro base station.

Referring to FIG. 4, in 410 the macro base station continuously maintains a control channel between a terminal and the macro base station regardless of whether a target base station of the terminal is a micro base station or the macro base. In this example, the micro base station may be included in a cell coverage of the macro base station.

When the terminal requests a handover from the micro base station to another micro base station, the macro base station may continuously maintain the control channel between the terminal and the macro base station regardless of the handover request of the terminal. When the control channel between the terminal and the macro base station is continuously maintained, the terminal may be provided with continuous and stable mobility from the macro base station even if a handover is suddenly performed.

An example in which a terminal requests a handover from the micro base station to the other micro base station is described with reference to FIG. 9.

In 410, the macro base station continuously maintains the control channel between the terminal and the macro base station until a control channel between the terminal and another macro base station is established.

For example, when the control channel is established between the terminal and a next macro base station, the terminal disconnects the control channel with the current macro base station. An example in which a control channel is established between the terminal and the other macro base station is described with reference to FIG. 10.

The macro base station receives a handover request message of the terminal through the control channel between the terminal and the macro base station, in 420. For example, the macro base station may determine whether the terminal is able to perform a handover to the target base station based on the handover request message.

The macro base station determines whether the target base station is the macro base station, in 430. When the target base station is not the macro base station, the macro base station searches for the target base station, in 440, and transmit data to the target base station (here, the micro base station), in 450.

When the target base station is the macro base station, the macro base station establishes a data channel between the macro base station and the terminal, in 460. In 470, the macro base station transmits and receives data with the terminal through the established data channel.

In 430, when the micro base station is the target base station of the handover, the macro base station may disconnect the data channel between the macro base station and the terminal. An example in which a data channel between the macro base station and the terminal is disconnected is described with reference to FIG. 7.

In 430, when the macro base station is the target base station of the handover, the micro base station may disconnect a data channel maintained between the micro base station and the terminal. An example in which the data channel between the micro base station and the terminal is disconnected is described with reference to FIG. 8.

Figure 5:
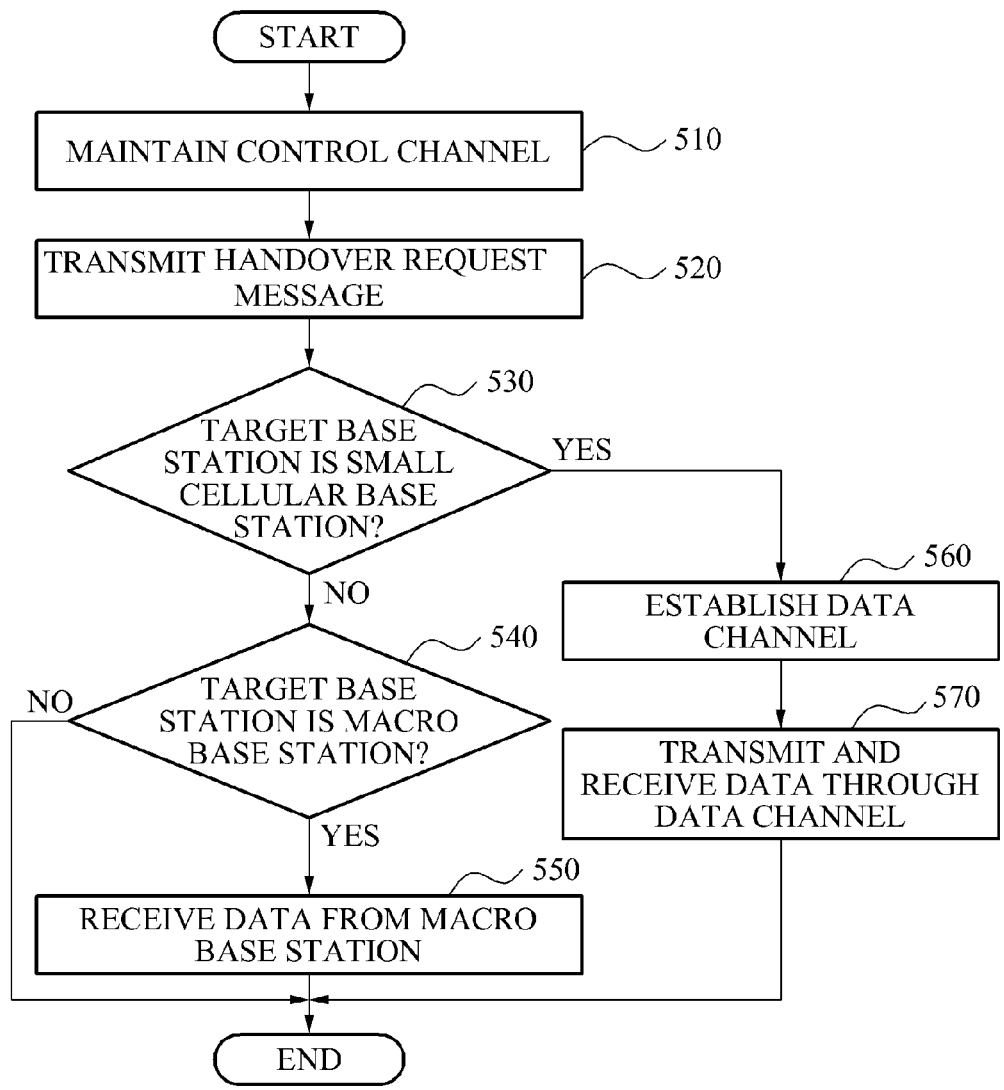
FIG. 5 is a flowchart illustrating an example of a communication method of a terminal.

FIG. 5 illustrates an example of a communication method of a terminal.

Referring to FIG. 5, in 510, the terminal included in a cell coverage of a macro base station continuously maintains a control channel between the terminal and the macro base station regardless of whether a target base station of a handover is a micro base station or the macro base station.

In 510, for example, the terminal may continuously maintain the control channel between the terminal and the macro base station until a control channel between the terminal and another macro base station is established.

The terminal transmits a handover request message of the terminal to the macro base station through the control channel between the terminal and the macro base station, in 520.

The terminal determines whether the target base station is the micro base station, in 530.

In 530, when the target base station is the macro base station in 540, the terminal receives data from the macro base station, in 550. In this example, the terminal may establish a data channel between the terminal and the macro base station to receive the data.

When the target base station is the micro base station, in 560 the terminal establishes a data channel between the micro base station and the terminal and receives data from the micro base station. In this example, the terminal establishes the data channel between the micro base station and the terminal while the control channel between the terminal and the macro base station is continuously maintained. In 570, data is transmitted and received through the established data channel (570).

Figure 6:
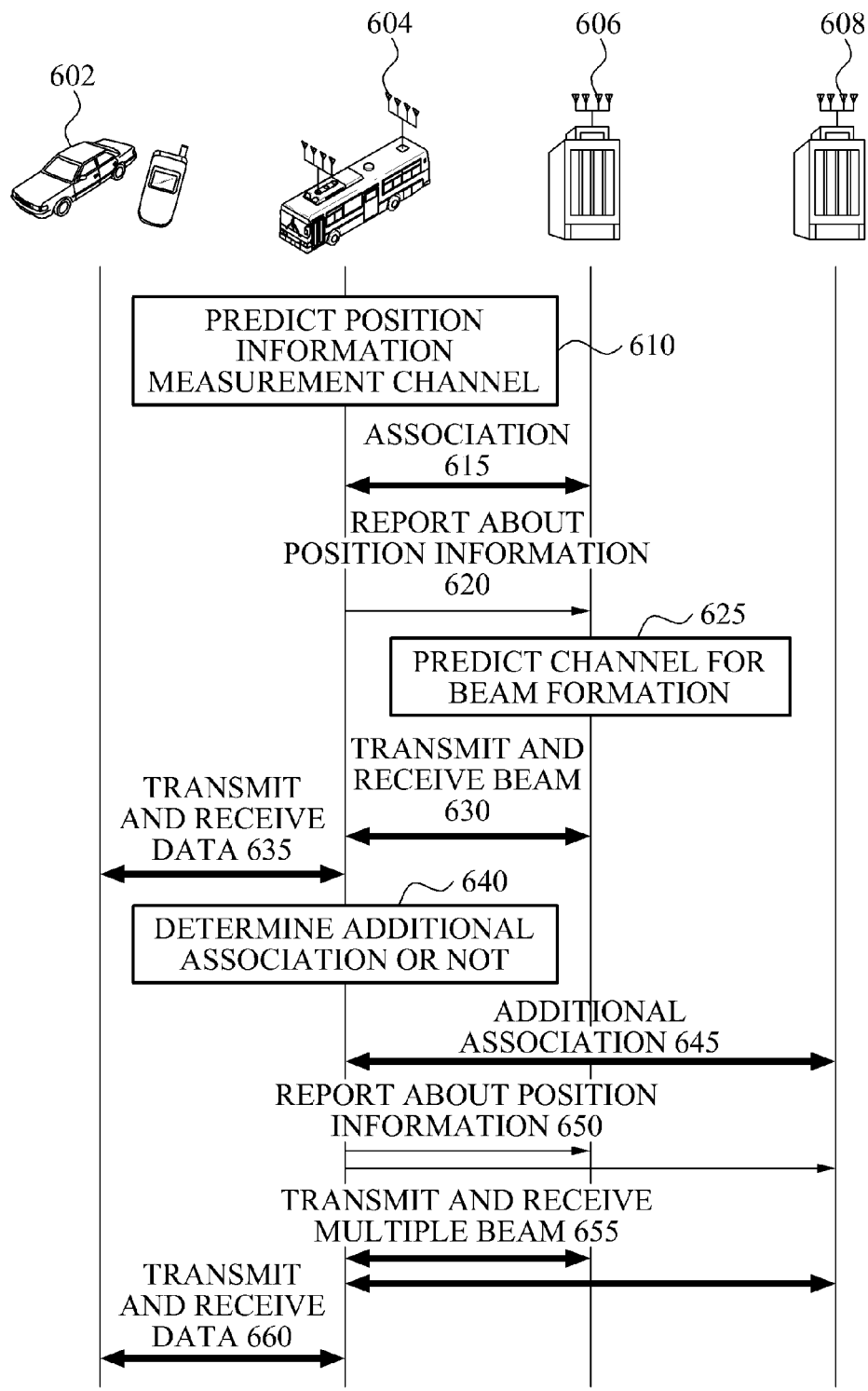
FIG. 6 illustrates an example of a terminal, a micro base station, and a macro base station for data transmission and reception.

FIG. 6 illustrates an example of a terminal, a micro base station, and a macro base station for data transmission and reception.

Referring to FIG. 6, a network includes a terminal 602, a micro base station 604, a macro base station 606, and a neighbor macro base station 608.

The micro base station 604 is mobile and is served by the macro base station 606. The micro base station 604 may measure position information of the micro base station 604. In 610, a channel between the macro base station 606 and the micro base station 604 may be predicted using the measured position information and a channel prediction database that stores information about possible positions of the micro base station 604. For example, a channel between the macro base station 606 and the micro base station 604 may be predicted based on the measured position information and the possible position information stored in the channel prediction database.

The micro base station 604 may perform association with the macro base station 606 that serves the micro base station 604 in order to transmit and receive data of the terminal 602, in 615.

In 615, for example, the micro base station 604 may select an optimal macro base station using the position information of the micro base station 604 that is mobile and the information that is stored in advance in the channel prediction database. Further, the micro base station 604 may request association with the selected optimal macro base station.

For example, the micro base station 604 may receive help with association through communication with the macro base station 606 and may perform the association with the macro base station 606.

The micro base station 604 reports about the position information of the micro base station 604 measured or collected by itself to the macro base station 606, in 620.

The macro base station 606 predicts a channel between the macro base station 606 and the micro base station 604 using the position information reported about by the micro base station 604 and the channel prediction database that stores the information about the possible positions of the micro base station 604, in 625.

The channel prediction may be used to form a beam for data transmission and reception between the micro base station 604 and the macro base station 606. In 630, the beam may be transmitted and received between the micro base station 604 and the macro base station 606 based on a state of the predicted channel in 625, in a zone in which the micro base station 604 exists.

In 635, the micro base station 604 which forms the beam for transmission and reception with the macro base station 606 may transmit and receive data with the terminal 602 within a cell coverage of the micro base station 604.

In 635, the micro base station 604 may transmit and receive data with terminals served by the micro base station 604 using a beam that is based on a zone with the macro base station 606 as a backhole.

In this example, the micro base station 604 may serve one or more terminals in a mobile vehicle in which the micro base station 604 is installed and/or one or more other terminals moving around the mobile vehicle.

The micro base station 604 may determine whether additional association is needed between the micro base station 604 and the neighbor macro base station 608, in 640.

As a result of the determination in 640, when the additional association is needed, in 645 the micro base station 604 may perform additional association with the neighbor macro base station 608.

For example, the micro base station 604 may transmit/receive the beam with two or more multiple macro base stations 606 and 608 in order to provide transmission and reception services of a high capacity data to terminals served by the micro base station 604.

When the additional association is performed, the micro base station 604 reports position information about the location of the micro base station 604 to the respective multiple macro base stations 606 and 608, in 650. In 655, the micro base station 604 may be provided with a backhole based on the zone to which the micro base station 604 exists from the multiple macro base stations 606 and 608, in 655.

For example, when the backhole based on the zone is provided from multiple macro base stations 606 and 608, in 660 the micro base station 604 may transmit and receive a high capacity data with the terminal 602 served by the micro base station 604.

In this example, while the micro base station 604 is a high capacity channel, handover may be performed unstably because of the relative mobility of the micro base station 604. Meanwhile, the macro base station 606 that has a large cell coverage, such as a macrocell, and which is installed in a fixed position has a relatively low capacity channel but may maintain the channel stably because of the large coverage.

Figure 7:
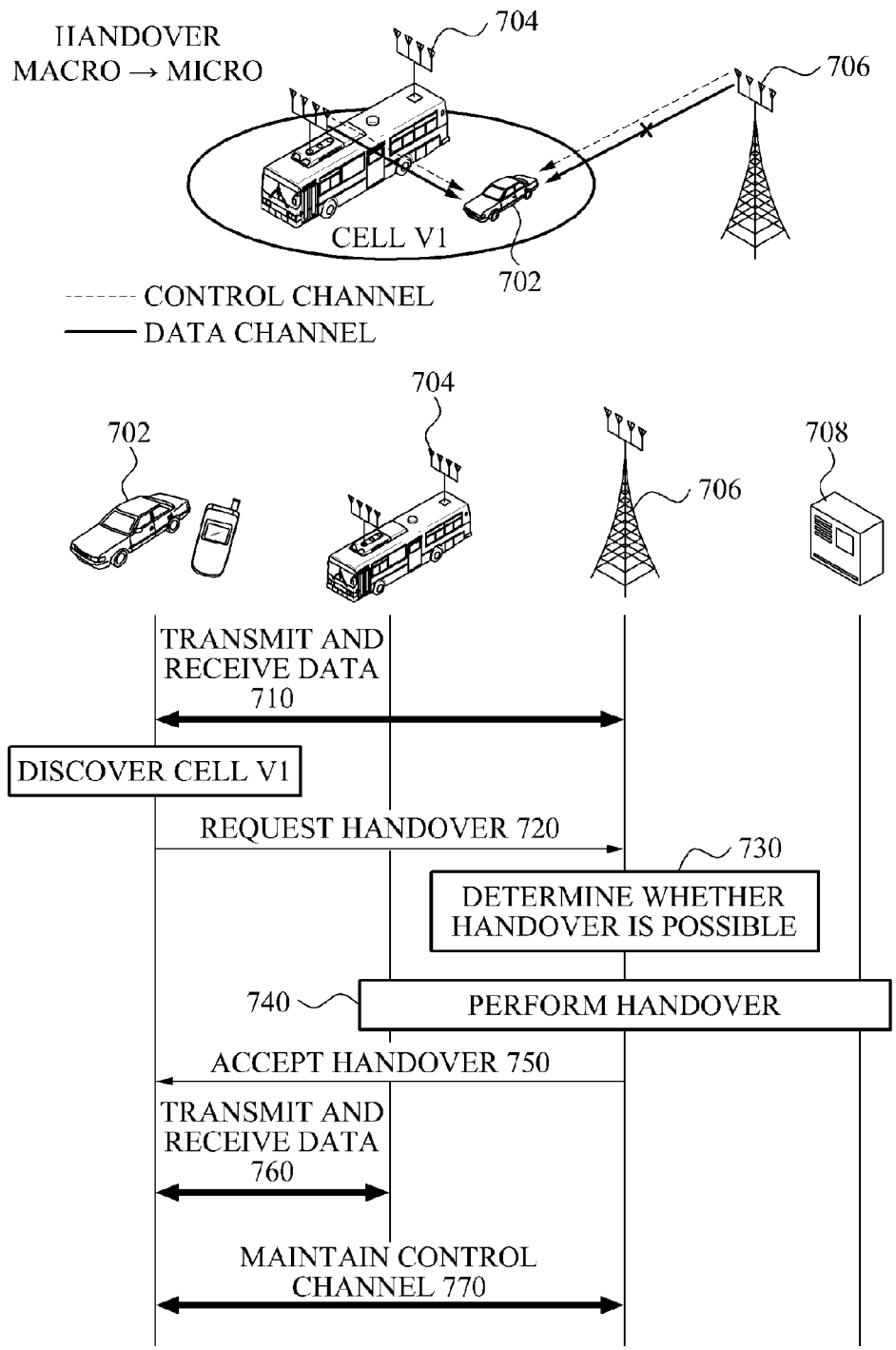
FIG. 7 illustrates an example of a terminal, a micro base station, and a macro base station when a handover is performed from the macro base station to the micro base station.

FIG. 7 illustrates an example of a terminal, a micro base station, and a macro base station when a handover is performed from the macro base station to the micro base station.

Referring to FIG. 7, data is generally transmitted and received among terminal 702, micro base station 704, and the macro base station 706, in 710. In this example, the micro base station 704 is within a cell coverage of macro base station 706. As an example, the terminal 702 may receive a broadcast signal transmitted by an adjacent micro base station 704 that has a cell coverage Cell V1 to discover the micro base station 704.

In 710, the terminal 702 continuously maintains a control channel between the terminal 702 and the macro base station 706 regardless of whether a target base station of a handover is the micro base station 704 or the macro base station 706.

For example, if a level of the broadcast signal received from the micro base station 704 is a predetermined value or more, in 720 the terminal 702 may request a handover from the macro base station 706 to the micro base station 704 through the control channel between the terminal 702 and the macro base station 706.

In 720, the terminal 702 may request the handover, for example, by transmitting a handover request message to the macro base station 706. For example, the handover request message may include information about quality of the broadcast signal received to the terminal 702 and channel-related information.

The macro base station 706 may determine whether the handover is possible to the target base station which in this case is the micro base station 704, based on the handover request message, in 730.

When the macro base station 706 determines that the handover is possible to the micro base station 704, the macro base station 706 performs the handover between the macro base station 706 and the micro base station 704, in 740.

In 740, when the macro base station 706 determines to perform the handover, the macro base station 706 may report information about the handover to be performed to a central unit 708, such as an evolved packet core (EPC). The macro base station 706 forwards related data to the micro base station 704 so that the micro base station 704 may prepare to transmit data of the terminal 702. Accordingly, the micro base station 704 completes preparation in order to accommodate the terminal 702.

The macro base station 706 may accept the handover to the terminal 702 by reporting about the handover to be performed, in 750.

When the handover is performed, the micro base station 704 is set as a serving cell to perform control of the terminal 702 and to transmit and receive data, in 760.

When the micro base station 704 is the target base station, a data channel between the terminal 702 and the macro base station 706 is disconnected, and a data channel between the terminal 702 and the micro base station 704 is connected in order to transmit and receive data.

However, the terminal 702 continuously maintains the control channel between the terminal 702 and the macro base station 706 regardless of whether the target base station of the handover is the micro base station 704 or the macro base station 706, in 770.

Because of the continuous maintenance of the control channel, the terminal 702 may be provided with quick and stable mobility from the macro base station 706 which is fixed in position even if a handover is suddenly performed.

Figure 8:
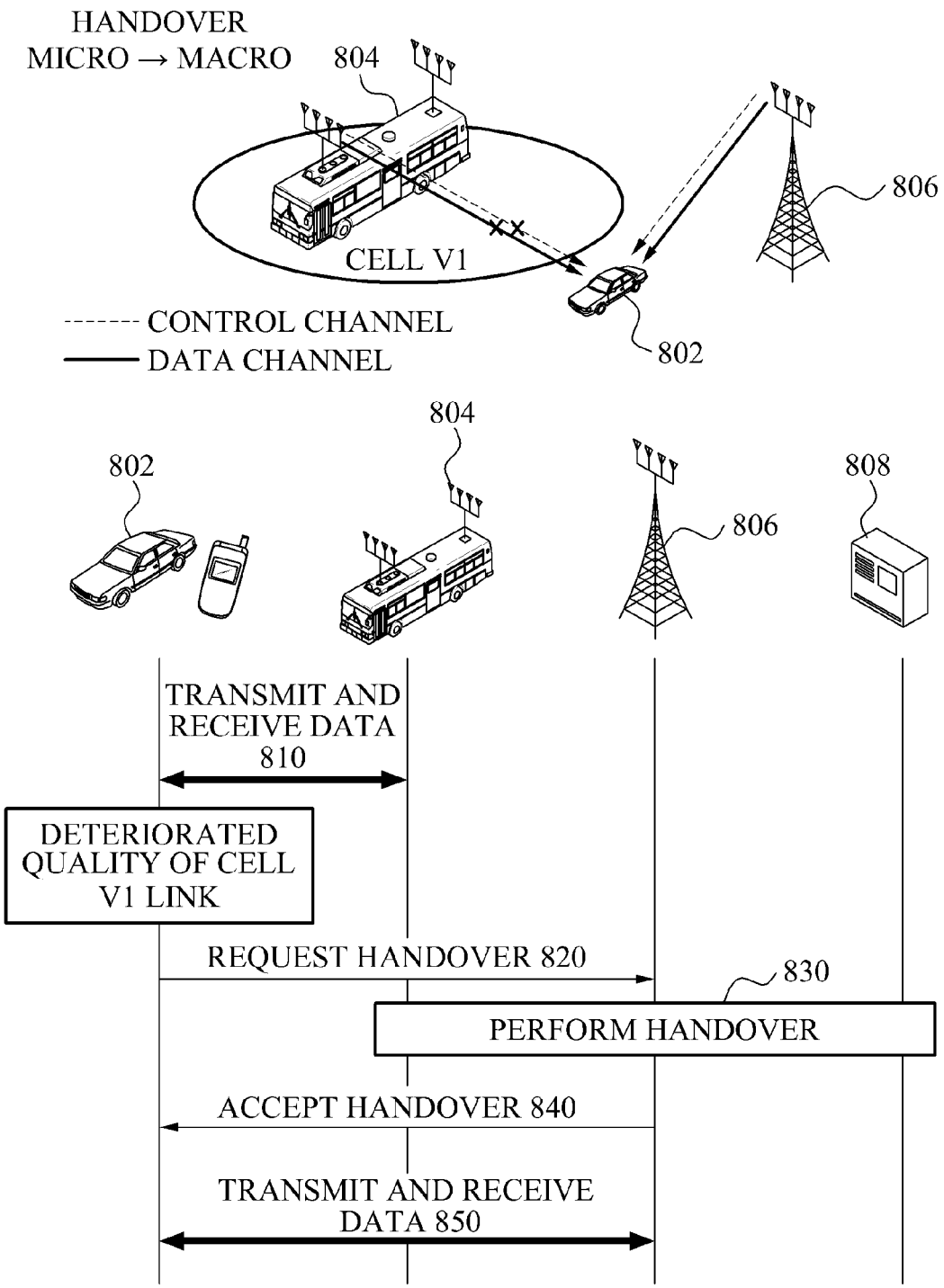
FIG. 8 illustrates an example of a terminal, a micro base station, and a macro base station when a handover is performed from the micro base station to the macro base station.

FIG. 8 illustrates an example of a terminal, a micro base station, and a macro base station when a handover is performed from the micro base station to the macro base station.

Referring to FIG. 8, data is transmitted and received between a micro base station 804 and a terminal 802 traveling within a cell coverage Cell V1 of the micro base station 804, in 810.

In 810, the micro base station 804 is set as a serving cell to maintain a control channel and a data channel with the terminal 802. In this example, a control channel between the terminal 802 and a macro base station 806 is also maintained.

The terminal 802 transmitting and receiving data with the micro base station 804 may request a handover directly from the macro base station 806 through the maintained control channel, in 820, for example, when quality of a signal received from the micro base station 804 deteriorates.

The quality of the signal received from the micro base station 804 may deteriorate, for example, when a traveling path between the moving terminal 802 and the moving micro base station 804 is changed, when there is an obstacle between the terminal 802 and the micro base station 804, when an interference phenomenon occurs between the terminal 802 and the micro base station 804 because of another terminal adjacent to the micro base station 804, another micro base station, another macro base station, and the like.

In 820, the macro base station 806 reports information about the handover to be performed to the micro base station 804 based on the request of the handover. In 830, the macro base station 806 performs the handover from the micro base station 804 to the macro base station 806, and accepts the handover to the terminal 802, in 840.

When the handover is performed, the macro base station 806 is set as a serving base station, and data is transmitted and received through the data channel between the terminal 802 and the macro base station 806, in 850.

When the macro base station 806 is a target base station, the control channel and the data channel between the micro base station 804 and the terminal 802 are disconnected. The reason why the channels may be disconnected is that the channels may not need maintaining in the macro base station 806 fixed in position.

Figure 9:
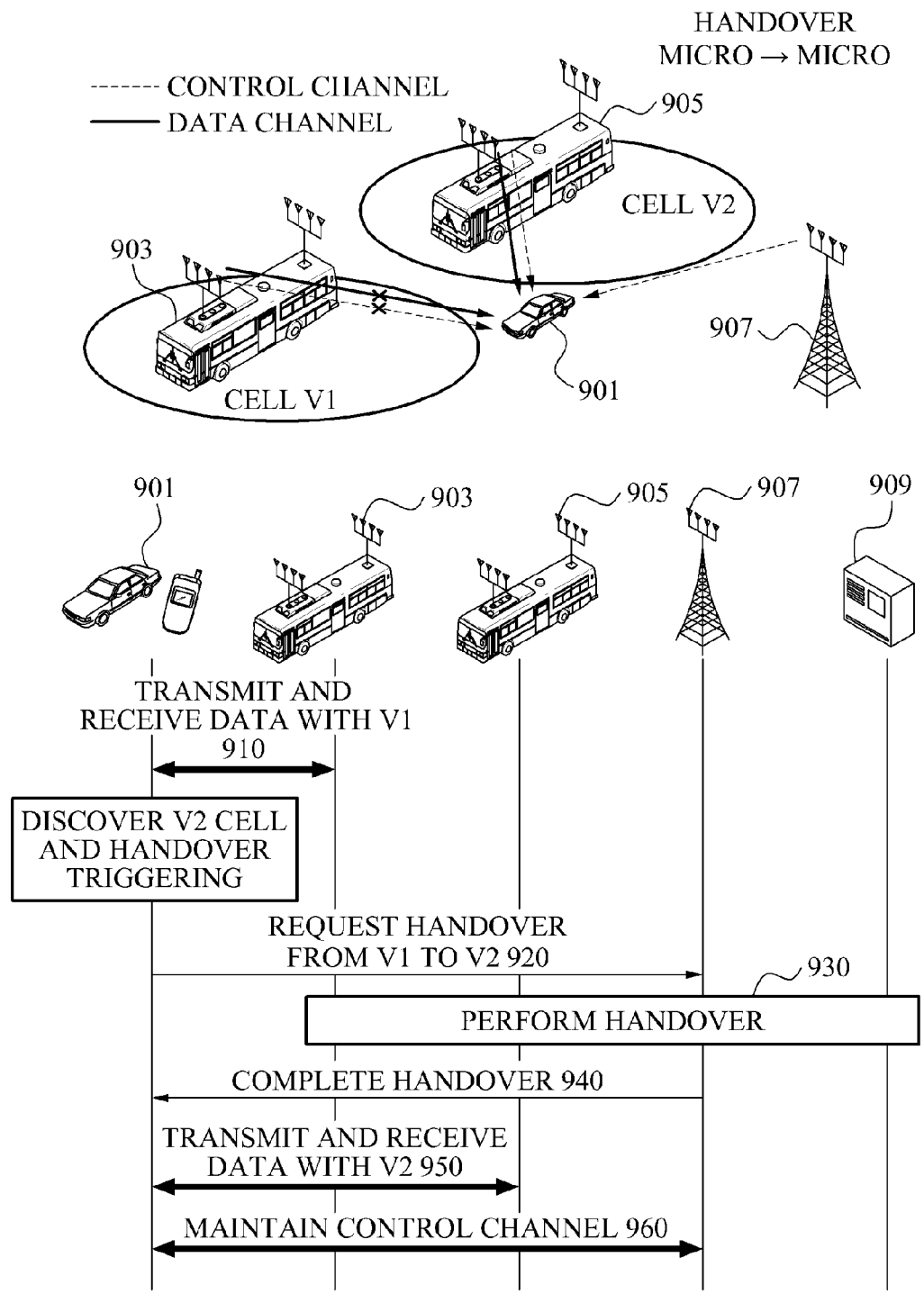
FIG. 9 illustrates an example of a terminal, a micro base station, another micro base station, a macro base station, and a central unit when a handover is performed between the micro base stations.

FIG. 9 illustrates an example of a terminal, a micro base station, another micro base station, a macro base station, and a central unit when a handover is performed between the micro base stations.

Referring to FIG. 9, micro base station 903 having a cell coverage Cell V1 transmits and receives data with terminal 901 and serves as a serving base station of the terminal 901, in 910. In this example, a control channel between the terminal 901 and macro base station 907 is continuously maintained.

The terminal 901 requests, from the macro base station 907, a handover from the micro base station 903 to another micro base station 905, in 920. For example, the terminal 901 may request a handover when the terminal 901 discovers the other micro base station 905 has a cell coverage Cell V2 that is better in quality of a channel.

In 920, the terminal 901 may use the continuously maintained control channel between the terminal 901 and the macro base station 907 in order to request the handover.

Further, in 920, the terminal 901 may request the handover from the macro base station 907, for example, using a handover request message, and the macro base station 907 may determine whether the terminal 901 may perform the handover to the other micro base station 905 based on the handover request message.

For example, the handover request message may include information about quality of a signal received to the terminal 902 from the respective micro base stations 903 and 905 and channel-related information.

When the handover between the micro base stations 903 and 905 is determined to be performed, the macro base station 907 reports about the handover to be performed to a central unit 909, such as an EPC. For example, the macro base station 907 may forward related data to the other micro base station 905 so that the other micro base station 905 may prepare to transmit data of the terminal 901. Accordingly, in 930 the other micro base station 905 prepares to accommodate the terminal 907.

When the macro base station 907 reports that the handover to the terminal 901 is completed, in 940, the terminal 901 sets the other micro base station 905 as a serving base station in 950, and transmits and receives data with the micro base station 905.

In order to transmit and receive the data, the terminal 901 may establish a new control channel and a new data channel between the terminal 901 and the other micro base station 905.

When the terminal 901 requests the handover from the micro base station 903 to the other micro base station 905, the control channel between the terminal 901 and the macro base station 907 is continuously maintained regardless of the handover request, in 960. As described above, because of the continuous maintenance of the control channel, the terminal 901 may be provided with quick and stable mobility from the macro base station 907 that is fixed in position even when a handover is suddenly performed.

On the contrary, the data channel and the control channel between the terminal 901 and the micro base station 903 are disconnected.

Figure 10:
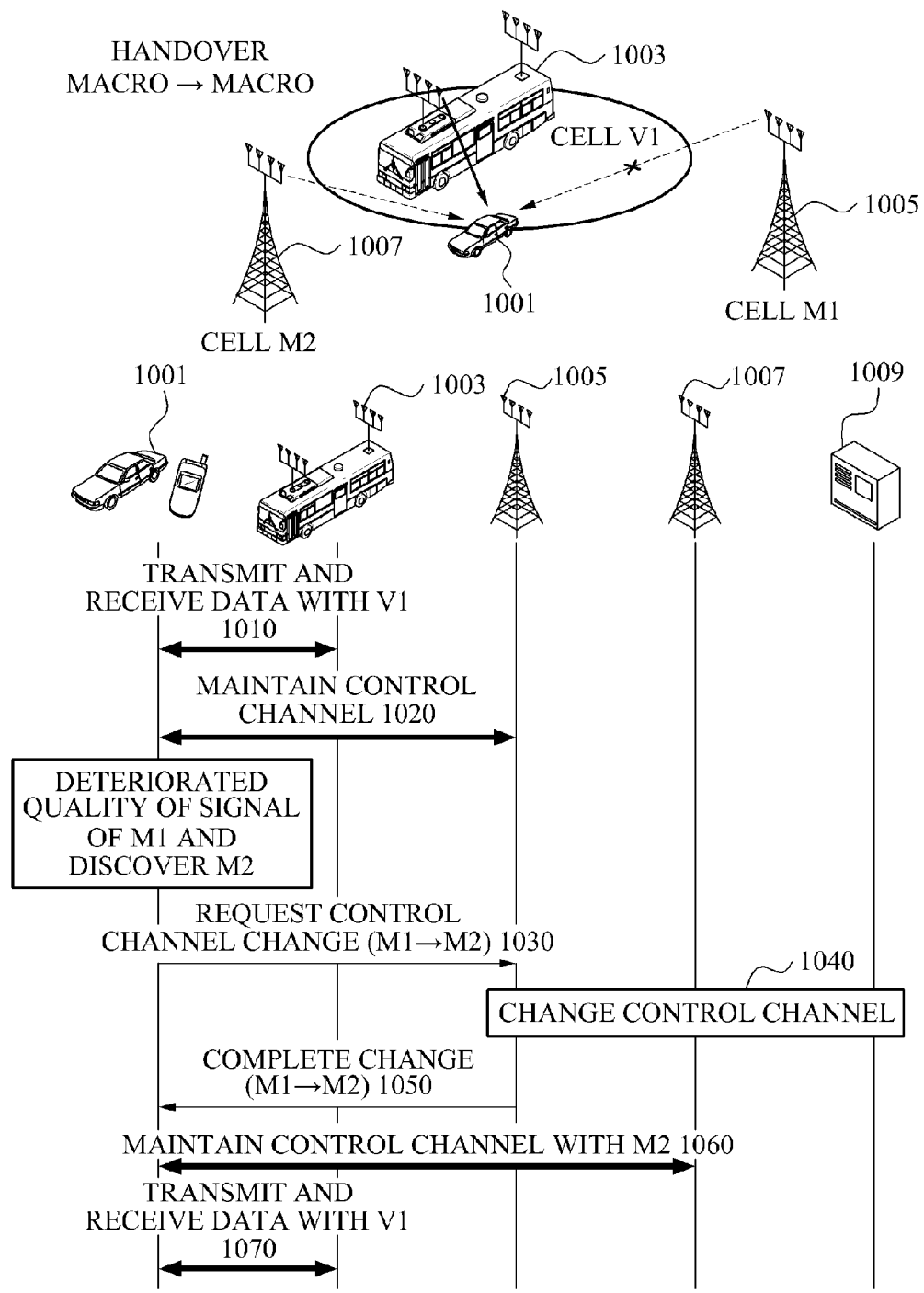
FIG. 10 illustrates an example of a terminal, a micro base station, a macro base station, another macro base station, and a central unit when a handover is performed between the macro base stations.

FIG. 10 illustrates an example of a terminal, a micro base station, a macro base station, another macro base station, and a central unit when a handover is performed between the macro base stations.

FIG. 10 illustrates an example where data is continually transmitted and received between terminal 1001 and micro base station 1003, and the handover is performed from macro base station 1005 supporting mobility of the terminal 1001 to another macro base station 1007.

In this example, the micro base station 1003 has a cell coverage Cell V1 and transmits and receives data with the terminal 1001 as a serving base station of the terminal 1001, in 1010.

In 1020, the terminal 1001 continuously maintains a control channel between the terminal 1001 and the macro base station 1005.

The terminal 1001 requests, from the macro base station 1005, a change of the control channel to the other macro base station 1007, in 1030. For example, when the quality of a signal received from the micro base station 1003 is superior, but quality of a signal received from the macro base station 1005 fixed in position deteriorates, and the terminal 1001 discovers a new macro base station 1007, the terminal may request, from the macro base station 1005, a handover of the control channel from macro base station 1005 to macro base station 1007.

The change of the control channel is requested through the continuously maintained control channel between the terminal 1001 and the macro base station 1005.

As another example, when the micro base station 1003 has a channel with the terminal 1001, the change of the control channel with respect to the macro base station 1005 may be requested through a control channel between the terminal 1001 and the micro base station 1003.

When the change of the control channel is requested, in 1040 the macro base station 1005 and the other macro base station 1007 change the control channel through information exchange and settings between each other, and report about the change of the control channel to the central unit 1009, such as an EPC.

In order to control stable mobility of the terminal 1001, in 1050 the macro base station 1005 reports about the change of the control channel between the terminal 1001 and the macro base station 1005 to the terminal 1001, when the change of control channel is completed.

For example, the macro base station 1005 may report about the change of the control channel through the control channel maintained between the terminal 1001 and the macro base station 1005.

To manage the mobility, in 1060 the terminal 1001 establishes a fixed control channel between the terminal 1001 and the other macro base station 1007, and continuously transmits and receives data using a data channel between the terminal 1001 and the micro base station 1003, in 1070.

In the networks including a micro base station described with reference to FIGS. 7 to 10, interference may occur among a terminal, the micro base station, and a macro base station. In order to reduce or prevent interference, for example, an interference control method may use a transmission power control, such as a delta-sigma modulation (DSM).

As another example, the interference control method may include a distributive interference control method in which interference is controlled in each position where the interference occurs or a centralized interference control method in which interference is controlled within a cell coverage of a macrocell.

For example, the centralized interference control method within the cell coverage of the macrocell may use interference alignment, interference mitigation, an interference-noise reduction, dynamic spectrum management for transmission power control, and the like.

To perform the centralized interference control method, a micro base station and a macro base station may exchange control information through a channel.

As an example, the above-described examples may be applied to both a frequency division duplex system and a time division duplex system and may also applicable to other kinds of systems.

Figure 11:
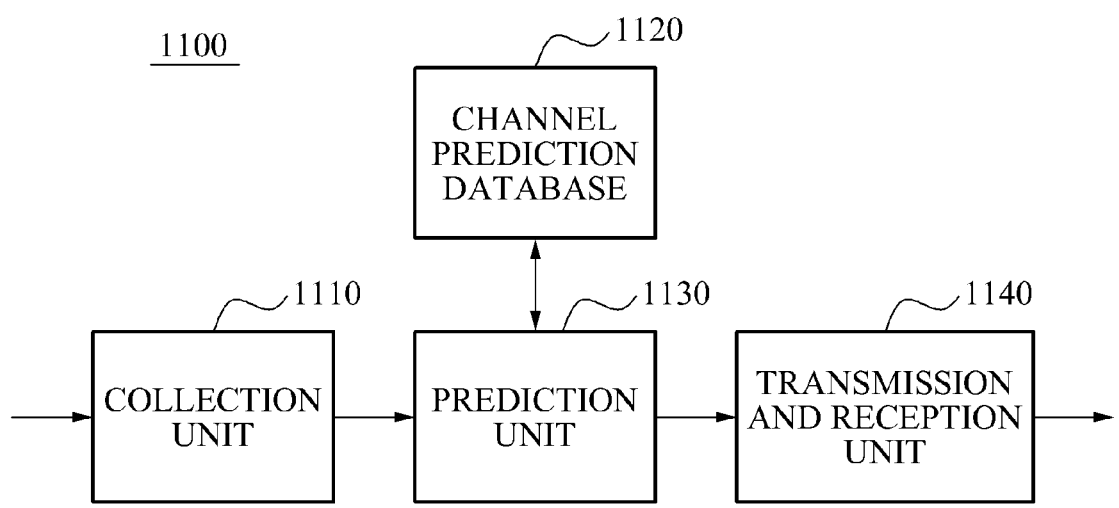
FIG. 11 is a diagram illustrating an example of a macro base station.

FIG. 11 illustrates an example of a macro base station.

Referring to FIG. 11, macro base station 1100 includes a collection unit 1110, a channel prediction database 1120, a prediction unit 1130, and a transmission and reception unit 1140.

The collection unit 1110 collects position information about a micro base station that has mobility and that is served by the macro base station. The collection unit 1110 may also collect information about the mobility of the micro base station. For example, the information about the mobility of the micro base station may include a traveling speed, a traveling direction, and a traveling path of the micro base station.

The channel prediction database 1120 stores channel information about channels between the macro base station and the micro base station based on possible positions of the micro base station. As another example, the channel prediction database 1120 may also store at least one of information about a traveling path of the micro base station, information about geographical features of surroundings of the micro base station based on the possible positions of the micro base station, information about possible traveling directions of the micro base station, and information about possible traveling speeds of the micro base station.

The prediction unit 1130 predicts a channel between the macro base station and the micro base station based on information stored in the channel prediction database 1120 that stores information about the channels between the macro base station and the micro base station based on the possible positions of the micro base station, and the position information about the micro base station, collected by the collection unit 1110.

As another example, the prediction unit 1130 may predict a channel between the macro base station and the micro base station based on the information about mobility of the micro base station collected by the collection unit 1110.

The transmission and reception unit 1140 transmits and receives data between the macro base station and the micro base station. For example, the transmission and reception unit 1140 may transmit/receive data based on a state of the channel predicted by the prediction unit 1130.

Figure 12:
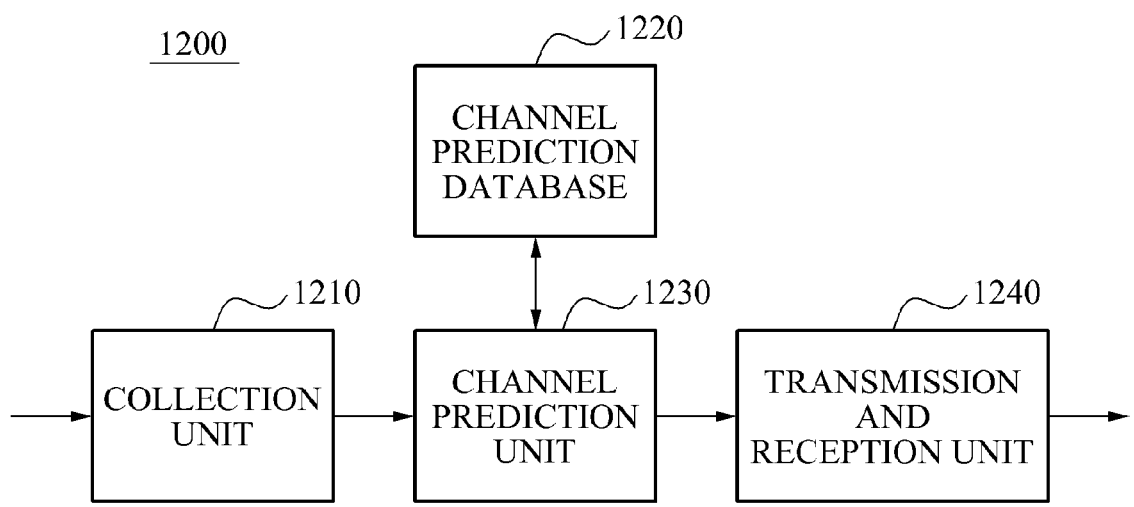
FIG. 12 is a diagram illustrating an example of a micro base station.

FIG. 12 illustrates an example of a micro base station.

Referring to FIG. 12, micro base station 1200 may be, for example, a femto base station, a pico base station, a moving relay, and the like. As an example, the micro base station 1200 may be installed in a mobile vehicle. The micro base station 1200 includes a collection unit 1210, a channel prediction database 1220, a channel prediction unit 1230, and a transmission and reception unit 1240.

The collection unit 1210 collects position information about the micro base station and reports about the position information to a macro base station.

The collection unit 1210 may include, for example, a GPS, an accelerator sensor, a gyro sensor, and the like, which may be used to collect position information about the micro base station and information about the mobility of the micro base station.

As another example, the collection unit 1210 may collect the position information about the micro base station using channel information including a degree of arrival (DOA) in the micro base station.

The channel prediction database 1220 stores channel information about channels between the macro base station and the micro base station based on possible positions of the micro base station. As another example, the channel prediction database 1220 may store at least one of information about a traveling path of the micro base station, information about geographical features of surroundings of the micro base station in the possible positions of the micro base station, information about possible traveling directions of the micro base station, and information about possible traveling speeds of the micro base station.

For example, the channel prediction database 1220 may be built based on a topographical model in order to predict a channel using the possible positions of the micro base station.

The channel prediction unit 1230 predicts a channel between the macro base station and the micro base station using information stored in the channel prediction database 1220 that stores information about the channels between the macro base station and the micro base station based on the possible positions of the micro base station, and the position information about the micro base station, collected by the collection unit 1110.

The channel prediction unit 1230 predicts a channel between the macro base station and the micro base station to transmit and receive a beam based on a zone. For example, a beam formation unit (not shown) may form a beam based on a zone by setting up a parameter of the beam based on the zone based on the predicted channel.

The transmission and reception unit 1240 transmits and receives data between the macro base station and the micro base station based on a state of the channel predicted by the channel prediction unit 1230.

Further, the transmission and reception unit 1240 may transmit and receive data between a terminal and the micro base station.

As another example, the micro base station may further include a cell formation unit (not shown) to provide a service to each terminal within a cell coverage of the micro base station. The cell formation unit may further include a backhole load balancer (not shown) which determines a backhole to transmit and receive data of each terminal within the cell coverage of the micro base station and to connect the data of each terminal to the backhole. As another example, the cell formation unit may further include a data processing unit (not shown) to process data received from one or more backholes into data for one micro base station or to change data received from each terminal within the cell coverage into a related form for backhole transmission.

The cell formation unit may determine a service to be provided to a terminal and may control the terminal based on whether the terminal is positioned nearby or within a mobile vehicle including the micro base station.

For example, when the terminal is positioned in vehicle including the micro base station, a relative speed may be 0 and stable transmission and reception is possible. However, when the terminal is positioned outside the vehicle including the micro base station, channel-aware scheduling may be needed because the relative speed may be more than 0 and surroundings may be changed, for example, due to shadowing that is caused by cars cutting in, and the like. In this example, the cell formation unit may preferentially provide a service to a terminal having a good channel condition.

When the terminal is positioned in a vehicle including the micro base station, the micro base station may manage an 'Active'/'Idle' MAC state.

However, when the terminal is positioned outside the micro base station, the micro base station may manage only an 'Active' MAC state, and the macro base station may always manage an 'Idle' MAC state. When a change to an 'Idle' MAC state is needed, the micro base station may perform a handover to a macrocell (macro base station).

For example, the micro base station may further include a communication controller (not shown) to control an operation of the micro base station by communication with the macro base station. For example, the communication controller may control an operation of the micro base station based on a control message transmitted and received with the macro base station or control a channel with the macro base station.

As another example, the micro base station may include multiple antennas, for example, an antenna installed outside a mobile vehicle for communication with an external base station, an antenna installed outside a mobile vehicle for transmission and reception with a terminal around the mobile vehicle, and an antenna installed in a mobile vehicle for transmission and reception with a terminal in the mobile vehicle.

Figure 13:
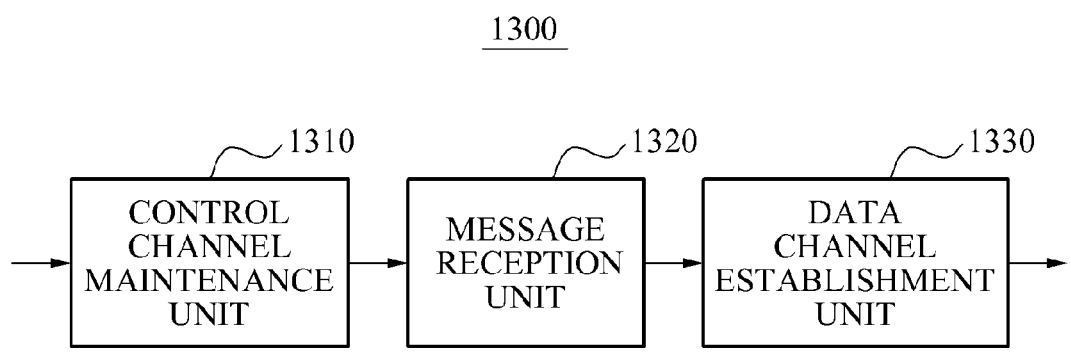
FIG. 13 is a diagram illustrating another example of a macro base station.

FIG. 13 illustrates another example of a macro base station.

Referring to FIG. 13, macro base station 1300 includes a control channel maintenance unit 1310, a message reception unit 1320, and a data channel establishment unit 1330.

The control channel maintenance unit 1310 continuously maintains a control channel between a terminal and the macro base station regardless of whether a target base station of a handover is a micro base station or the macro base station.

For example, the control channel maintenance unit 1310 may continuously maintain the channel between the terminal and the macro base station until a control channel between the terminal and another macro base station is established.

The message reception unit 1320 receives a handover request message of the terminal through the control channel between the terminal and the macro base station.

The data channel establishment unit 1330 establishes a data channel between the terminal and the macro base station, in response to the handover request message received by the message reception unit 1320.

Further, the data channel establishment unit 1330 transmits data to a micro base station, in response to the handover request message received by the message reception unit 1320.

Figure 14:
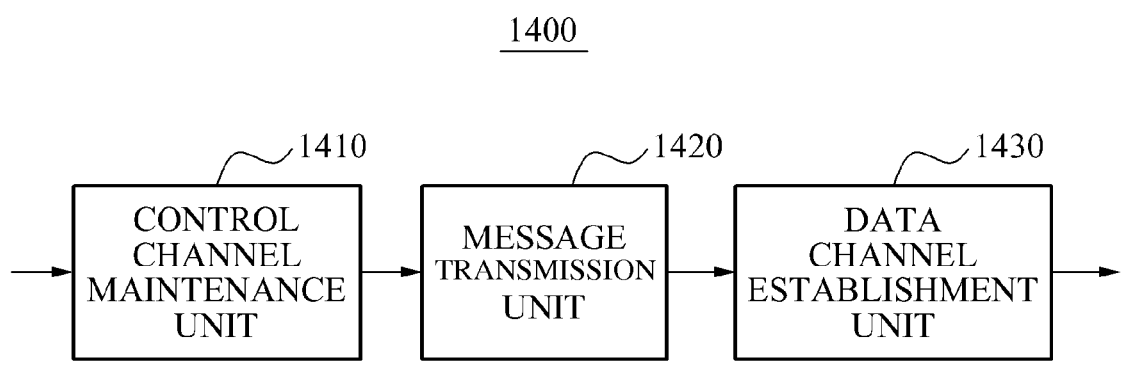
FIG. 14 is a diagram illustrating an example of a terminal

FIG. 14 illustrates an example of a terminal. Referring to FIG. 14, terminal 1400 includes a control channel maintenance unit 1410, a message transmission unit 1420, and a data channel establishment unit 1430.

The control channel maintenance unit 1410 continuously maintains a control channel between the terminal and a macro base station regardless of whether a target base station of a handover of the terminal is a micro base station or the macro base station.

For example, the terminal may continuously maintain the control channel between to the terminal and the macro base station to be provided with quick and stable mobility from the macro base station fixed in position even when a handover is suddenly performed.

In this example, the terminal is included in a cell coverage of the macro base station.

The message transmission unit 1420 transmits a handover request message of the terminal to the macro base station through the control channel between the terminal and the macro base station.

The data channel establishment unit 1430 establishes a data channel between the terminal and the macro base station or receives data from a micro base station.

It should be appreciated that the examples described with reference to FIGS. 1 to 10 may be applied to the examples shown in FIGS. 11 to 14.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a macro base station, the communication method comprising:
   collecting position information about a micro base station that is mobile and that is served by the macro base station;
   predicting a channel between the macro base station and the micro base station based on the position information, using information stored in a channel prediction database that stores information about channels between the macro base station and the micro base station based on possible positions of the micro base station;
   transmitting and receiving data between the macro base station and the micro base station based on a state of the predicted channel;
   determining whether a traveling path of the micro base station is predictable; and
   requesting feedback on information about the channel from the micro base station when the traveling path is determined to be unpredictable.

2. The communication method of claim 1, wherein the predicting of the channel comprises:
   predicting the traveling path of the micro base station using the information stored in the channel prediction database; and
   extracting information about the channel between the macro base station and the micro base station from the channel prediction database based on the position information about the micro base station.

3. The communication method of claim 1, wherein the channel prediction database further stores information about the traveling path of the micro base station, or information about geographical features of surroundings of the micro base station based on the possible positions of the micro base station, or information about possible traveling directions of the micro base station, or information about possible traveling speeds of the micro base station, or any combination thereof.

4. The communication method of claim 1, further comprising:
   collecting information about a mobility of the micro base station,
   wherein the predicting of the channel comprises predicting the channel based on the information about the mobility of the micro base station.

5. The communication method of claim 1, wherein:
   the micro base station comprises a femto base station or a moving relay; and
   the micro base station is installed in a mobile vehicle.

6. The communication method of claim 1, wherein the transmitting and the receiving of the data comprises forming a beam between the macro base station and the micro base station based on a strength of the channel or a direction of the channel.

7. The communication method of claim 1, wherein the transmitting and the receiving of the data comprises determining a level of an optimal modulation and coding scheme (MSC) or determining an allocation structure of an optimal wireless resource, based on a strength of the channel or a direction of the channel.

8. The communication method of claim 1, wherein the predicting of the channel comprises predicting the channel without requesting feedback on information about the channel from the micro base station during a preset time period.

9. The communication method of claim 1, wherein the transmitting and the receiving of the data comprises performing collective link adaptation for a plurality of terminals in a zone that the micro base station exists in.

10. A communication method of a micro base station, the communication method comprising:
    collecting position information about the micro base station that is mobile and that is served by a macro base station, and reporting about the position information to the macro base station;
    predicting, by the micro base station, a channel between the macro base station and the micro base station based on the position information, using information stored in a channel prediction database of the micro base station that stores information about channels between the macro base station and the micro base station based on possible positions of the micro base station;
    transmitting and receiving data between the macro base station and the micro base station based on a state of the predicted channel;
    determining whether an additional association is needed between a neighbor macro base station and the micro base station based on a capacity required by the micro base station, the state of the channel between the micro base station and the macro base station, and a state of a channel between the micro base station and the neighbor macro base station; and
    reporting about the position information about the micro base station to the neighbor macro base station when the additional association is determined to be needed.

11. The communication method of claim 10, wherein the predicting of the channel comprises:
    predicting a traveling path of the micro base station using the information stored in the channel prediction database; and
    extracting information about the channel between the macro base station and the micro base station from the channel prediction database based on the position information about the micro base station.

12. The communication method of claim 10, further comprising:
    selecting one macro base station from among the macro base station and the neighbor macro base station; and
    transmitting data to the selected one macro base station so that the macro base station and the neighbor macro base station share the data.

13. The communication method of claim 10, wherein the channel prediction database further stores information about a traveling path of the micro base station, or information about geographical features of surroundings of the micro base station based on the possible positions of the micro base station, or information about possible traveling directions of the micro base station, or information about possible traveling speeds of the micro base station, or any combination thereof.

14. A computer-readable storage medium storing program instructions to cause a processor to implement a communication method of a macro base station, the communication method comprising:
   collecting position information about a micro base station that is mobile and that is served by the macro base station;
   predicting a channel between the macro base station and the micro base station based on the position information, using information stored in a channel prediction database that stores information about channels between the macro base station and the micro base station based on possible positions of the micro base station;
   transmitting and receiving data between the macro base station and the micro base station based on a state of the predicted channel;
   determining whether a traveling path of the micro base station is predictable; and
   requesting feedback on information about the channel from the micro base station when the traveling path is determined to be unpredictable.

15. The communication method of claim 1, wherein the micro base station comprises a femto base station.

16. The communication method of claim 1, wherein the requesting of the feedback on the information about the channel from the micro base station is performed instead of the collecting of the position information about the micro base station.

17. The communication method of claim 1, further comprising:
   requesting the position information about the micro base station from the micro base station based on a result of the determining of whether the traveling path of the micro base station is predictable.

18. The communication method of claim 1, further comprising:
   predicting the channel based on a result of the determining of whether the traveling path of the micro base station is predictable.

19. The communication method of claim 1, wherein the determining of whether the traveling path of the micro base station is predictable comprises determining whether the traveling path of the micro base station is predictable based on whether a traveling pattern of the micro base station matches a predefined pattern or a structure of a road on which the micro base station stands.

* * * * *